(12) United States Patent
Kamerbeek et al.

(10) Patent No.: US 8,808,777 B2
(45) Date of Patent: *Aug. 19, 2014

(54) SYSTEM AND METHOD FOR PREPARING A BEVERAGE

(75) Inventors: Ralf Kamerbeek, De Meern (NL); John Henri Flamand, Lunteren (NL); Hendrik Cornelis Koeling, Amersfoort (NL); Angenita Dorothea Post van Loon, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,397

(22) Filed: Dec. 12, 2011

(65) Prior Publication Data

US 2012/0231133 A1 Sep. 13, 2012

Related U.S. Application Data

(63) Continuation of application No. PCT/NL2009/050828, filed on Dec. 30, 2009.

(30) Foreign Application Priority Data

| Jun. 17, 2009 | (EP) | 09162917 |
| Jun. 17, 2009 | (EP) | 09162927 |
| Jun. 17, 2009 | (EP) | 09162941 |
| Jun. 17, 2009 | (EP) | 09162984 |

(51) Int. Cl.
A23F 5/26 (2006.01)

(52) U.S. Cl.
USPC ............. 426/431; 426/78; 426/79; 426/77; 99/295

(58) Field of Classification Search
USPC ................. 426/78, 115, 79, 431
See application file for complete search history.

(56) References Cited

U.S. PATENT DOCUMENTS

| 2,292,101 | A | * | 8/1942 | Brown ............................ 426/77 |
| 3,445,237 | A | * | 5/1969 | Gidge Lester ................. 426/77 |
| 3,615,708 | A | | 10/1971 | Abile-Gal |

(Continued)

FOREIGN PATENT DOCUMENTS

| CA | 2072300 | 1/1993 |
| CH | 434 609 | 10/1967 |

(Continued)

OTHER PUBLICATIONS

International Search Report for PCT/NL2009/050828, completed Feb. 19, 2010, 5 pages.

(Continued)

*Primary Examiner* — Anthony Weier
(74) *Attorney, Agent, or Firm* — Foley & Lardner LLP

(57) ABSTRACT

A capsule, system and method for preparing a predetermined quantity of beverage suitable for consumption using an extractable product is shown. The capsule includes a circumferential first wall, a second wall closing the circumferential first wall at a first end, and a flexible sheet-shaped perforate and/or porous third wall closing the circumferential first wall at a second, open, end opposite the second wall. The first, second and third wall enclose an inner space including the extractable product. The third wall forms an outermost boundary of the capsule in an axial direction thereof. The third wall comprises a woven or nonwoven filtering material, such as filtering paper.

37 Claims, 7 Drawing Sheets

(56) References Cited

U.S. PATENT DOCUMENTS

| | | | |
|---|---|---|---|
| 3,811,373 A * | 5/1974 | Telco | 99/295 |
| 3,844,206 A * | 10/1974 | Weber | 99/282 |
| 4,321,139 A | 3/1982 | Auclair | |
| 4,417,504 A | 11/1983 | Yamamoto | |
| 4,859,337 A | 8/1989 | Woltermann | |
| 4,860,645 A * | 8/1989 | van der Lijn et al. | 99/295 |
| 4,921,712 A * | 5/1990 | Malmquist | 464/77 |
| 4,995,978 A * | 2/1991 | Van de Gang | 210/474 |
| 5,325,765 A | 7/1994 | Sylvan et al. | |
| 5,840,189 A | 11/1998 | Sylvan et al. | |
| D408,679 S | 4/1999 | Potts et al. | |
| 5,906,845 A * | 5/1999 | Robertson | 426/80 |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |
| D452,433 S | 12/2001 | Lazaris | |
| D452,434 S | 12/2001 | Sweeney | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,644,173 B2 | 11/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| 6,777,007 B2 * | 8/2004 | Cai | 426/78 |
| D502,362 S | 3/2005 | Lazaris et al. | |
| D513,572 S | 1/2006 | Schaffeld et al. | |
| 7,165,488 B2 | 1/2007 | Bragg et al. | |
| D544,299 S | 6/2007 | Schaffeld et al. | |
| D554,299 S | 10/2007 | Ragonetti et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,513,192 B2 | 4/2009 | Sullivan et al. | |
| 7,523,695 B2 | 4/2009 | Streeter et al. | |
| 7,543,527 B2 | 6/2009 | Schmed | |
| 7,552,672 B2 | 6/2009 | Schmed | |
| 7,624,673 B2 * | 12/2009 | Zanetti | 99/295 |
| 7,640,845 B2 | 1/2010 | Woodnorth et al. | |
| 7,856,920 B2 | 12/2010 | Schmed et al. | |
| 2003/0096038 A1 | 5/2003 | Cai | |
| 2004/0045443 A1 | 3/2004 | Lazaris et al. | |
| 2005/0051478 A1 | 3/2005 | Karanikos et al. | |
| 2005/0205601 A1 | 9/2005 | Taylor | |
| 2005/0287251 A1 | 12/2005 | Lazaris et al. | |
| 2006/0174773 A1 | 8/2006 | Taylor | |
| 2006/0292012 A1 | 12/2006 | Brudevold et al. | |
| 2008/0095904 A1 | 4/2008 | Sullivan et al. | |
| 2008/0115674 A1 | 5/2008 | Huang et al. | |
| 2008/0134902 A1 | 6/2008 | Zimmerman et al. | |
| 2008/0257165 A1 * | 10/2008 | Bolzicco et al. | 99/295 |
| 2010/0024658 A1 | 2/2010 | Jacobs et al. | |
| 2010/0043646 A1 * | 2/2010 | Suggi Liverani et al. | 99/295 |
| 2010/0303964 A1 | 12/2010 | Beaulieu et al. | |
| 2012/0276252 A1 * | 11/2012 | Bunke et al. | 426/77 |

FOREIGN PATENT DOCUMENTS

| | | | |
|---|---|---|---|
| EP | 0 114 717 | | 8/1984 |
| EP | 0211511 | * | 6/1986 |
| EP | 0 361 569 | | 4/1990 |
| EP | 0493856 | * | 12/1991 |
| EP | 0 904 717 | | 3/1999 |
| EP | 1 867 584 | | 12/2007 |
| EP | 2230195 | | 9/2010 |
| FR | 757 358 | | 12/1933 |
| FR | 1 543 608 | | 10/1968 |
| FR | 2 127 329 | | 10/1972 |
| FR | 2 617 389 | | 1/1989 |
| JP | 06-46815 | | 2/1994 |
| WO | WO-03/105644 | | 12/2003 |
| WO | WO-2006/126104 | | 11/2006 |
| WO | WO-2007/135136 | | 11/2007 |

OTHER PUBLICATIONS

Japanese Office Action and Translation thereof for Japanese Application No. 2012-516014, dated Jul. 11, 2013, 14 pages.
Office Action for Israeli Application No. 217023, mail date Nov. 12, 2013, 6 pages.

* cited by examiner

SYSTEM AND METHOD FOR PREPARING A BEVERAGE

CROSS-REFERENCE TO RELATED APPLICATIONS

The present application is a continuation of International Patent Application Serial No. PCT/NL2009/050828 filed on Dec. 30, 2009; which claimed priority to European Application Nos. EP09162941.0 filed on Jun. 17, 2009, EP09162917.0 filed on Jun. 17, 2009, EP09162927.9 filed on Jun. 17, 2009, and EP09162984.0 filed on Jun. 17, 2009—all of which are hereby incorporated herein by reference.

BACKGROUND

The invention relates to a system for preparing a predetermined quantity of beverage suitable for consumption using an extractable product, comprising: an exchangeable capsule; and an apparatus comprising a fluid dispensing device for supplying an amount of a fluid, such as water, under a pressure of at least six bar to the exchangeable capsule, and a receptacle for holding the exchangeable capsule; wherein the exchangeable capsule comprises a circumferential first wall, a second wall closing the circumferential first wall at a first end, and a third wall closing the circumferential first wall at a second, open, end opposite the second wall, wherein the first, second and third wall enclose an inner space comprising the extractable product; wherein the fluid dispensing device is arranged for supplying the fluid to the extractable product through the second wall for forming the beverage; and wherein the receptacle comprises a support surface, and the third wall is arranged to abut against the support surface for draining the prepared beverage from the capsule through the third wall and through the support surface. The invention also relates to a capsule and method for preparing a beverage.

Such a system is for example known from WO2007/135136A1, which describes a brewing device for the brewing of a capsule containing a beverage ingredient. This known brewing device comprises a main frame, as well as a first and a second capsule holding part for at least partially holding the capsule. Said first capsule holding part comprises the above-mentioned support surface for the third wall of the capsule to abut against. Said second capsule holding part is movable relative to the first capsule holding part in the frame and is linked to the frame by a closing mechanism comprising knuckle joint means or equivalent means to move from an open position at which the two parts are distant relative to one another to enable the insertion of the capsule between the two parts and a closed position at which the first and second holding parts are closed about the capsule. This known brewing device further comprises a manual handle forming lever to activate via the closing mechanism the second holding part from the open position to the closed position and vice versa.

The frame of this known device is provided with an upper passage arranged for inserting a fresh capsule in the device when the holding parts have been brought in the open position. The frame also comprises a lower passage for discarding of the waste capsule once the brewing process, which takes place in the closed position of the holding parts, is over and the holding parts have been re-opened.

After a fresh capsule has been inserted in the known device, the holding parts can be brought in the closed position. In this closed position the brewing process can be carried out. During this brewing process the second wall of the capsule is pierced by piercing elements such as blades, so that the capsule is open for allowing pressurized water to enter the capsule. At that time, the third wall of the capsule is in intensive abutment with the support surface of the first holding part. In fact, the said intensive abutment results in the capsule sticking to the support surface.

During the initial phase of re-opening of the holding parts, the capsule still is in engagement with the piercing elements, which piercing elements are connected to and moveable together with the second holding part. Thus, upon re-opening, the piercing elements release the capsule from the support surface of the first holding part and they pull the capsule away from that support surface. In order to let the capsule fall down by gravity through the lower passage in the frame, the capsule again has to be released, this time from the piercing elements. On page 19, lines 1-12 of WO2007/135136A1 there is described one way of releasing the capsule from the piercing elements. This involves the use of a length compensatory tube portion of the water supply means, which portion is non-moveable relative to the frame. The compensatory portion of tube pushes the capsule in such way that the capsule becomes disengaged from the piercing elements when the second holding part moves away from the first holding part.

SUMMARY

It is an object of the invention to provide at least an alternative solution according to which a capsule is released from the support surface. More in particular, it is an object of the invention to provide such an alternative solution which is less complex than the above described known solution, and which alternative solution even works in cases where such piercing elements as described above are not present in a system or in cases where such piercing elements are inactive during the brewing of certain types of capsules.

For that purpose, the invention provides a capsule as described herein. Also, the invention provides a system as described herein. Furthermore, the invention provides a method as described herein. Specific embodiments of the invention are described herein.

Since the third wall of the capsule comprises a woven or non-woven filtering material, such as filtering paper, forms an outermost boundary of the capsule in an axial direction thereof, and is arranged to abut against the support surface, the woven or non-woven filtering material in the said outermost boundary of the capsule abuts the support surface, whereby, after use of the capsule, sticking of the capsule to the support surface is prevented and release of the capsule is promoted. Hence, according to the solution of the invention, the releasing of the capsule from the support surface does not require active piercing means as described for the known device, let alone additional measures to subsequently release the capsule from such piercing means. It will be appreciated that the non-woven filtering material may be a fibrous non-woven material. It will be appreciated that the woven filtering material may be a fibrous woven material. The fibres of the fibrous material may e.g. include synthetic fibres such as polyethylene (PE) fibres and/or natural fibres such as cellulose fibres. The nonwoven filtering material may perform even better at preventing sticking than the woven filtering material, possibly due to its random orientation of fibres.

Preferably, the exchangeable capsule comprises an amount of extractable product, and thus is suitable and intended, for preparing a single portion of the beverage, preferably a single cup of the beverage, e.g. from 30-200 ml of the prepared beverage. The exchangeable capsule, thus, is a single-portion-pack. In an embodiment, the capsule comprises 4-8 grams, preferably approximately 7 grams of extractable product, e.g. roasted and ground coffee.

Preferably, the exchangeable capsule is disposable after single use.

In an embodiment, the fluid dispensing device is arranged for supplying the fluid to the exchangeable capsule under a pressure of approximately 4-20 bars, preferably 9-15 bars. It is possible that the fluid dispensing device is arranged for supplying the fluid to the exchangeable capsule under a pressure of e.g. at least 6 bars (absolute pressure).

Preferably, the support surface comprises channel shaped grooves in a side facing the third wall, for draining the prepared beverage from the capsule through the grooves. Hence, the prepared beverage can be drained from the capsule through the third wall into the channel shaped grooves. This provides improved outflow of the beverage out of the capsule.

It is noted that an apparatus for preparing a beverage having a receptacle for a pill-shaped pouch manufactured from filtering paper and filled with ground coffee, wherein the receptacle has a bottom comprising channel-shaped grooves, is described in WO 03/105644 (via reference to EP 0 904 717). Nevertheless, this known apparatus is not intended, nor suitable for supplying the liquid to the capsule according to the invention at the high pressure. WO 03/105644 mentions a relatively low pressure of 1.4 atm at which the water is supplied to the pouch, and it is generally assumed that the pill-shaped pouch manufactured from filtering paper will rupture when supplying the water under the high pressure of e.g. more than approximately six bars.

It was, however, found by the inventor that, contrary to common belief, it is well technically feasible to provide the sheet-shaped third wall having the sufficiently high tear strength and/or forming the sufficiently low flow resistance that the third wall, in use, does not tear and/or rupture and stays intact.

Preferably, the support surface comprises, between the channel shaped grooves, ridges against which the third wall, in use, abuts. Preferably the ridges form at least 10%, preferably at least 25%, most preferably at least 50% of the portion of the support surface which, in use, coincides with the portion of the surface area of the third wall overlying the second, open, end. Preferably, in use, the third wall is supported by the ridges over at least 10%, preferably at least 25%, most preferably at least 50% of the portion the surface area of the third wall overlying the second, open, end. Hence, the third wall, in use, is well supported by the ridges of the support surface, thus making possible in an easy manner that third wall, in use, does not tear and/or rupture and stays intact.

Preferably, the ridges comprise edges, wherein the edges are not sharp. Preferably, the edges have a radius of curvature of at least 50 μm, preferably at least 100 μm. Thus it is possible to provide, in an easy manner, that third wall, in use, does not tear and/or rupture and stays intact.

In an embodiment, the ridges have a convex top. Hence, when the third wall, in use, is pressed against the ridges, the surface area over which the third wall is supported by the ridges increases, thus reducing the local pressure exerted on the third wall by the ridges. Thus it is possible to provide, in an easy manner, that the third wall, in use, does not tear and/or rupture and stays intact.

An abutting area of the support surface, which abutting area is intended for abutment with the third wall, may have, apart from local depressions and/or local protrusions therein, a substantially straight form. Alternatively, however, such abutting area may have, apart from local depressions and/or local protrusions therein, a substantially non-straight form, such as a substantially convex form.

In an embodiment, the third wall is formed by a sheet of filtering paper. The filtering paper provides the low-cost third wall. Moreover, parameters of the filtering paper, such as density, thickness and/or PE-content, can easily be chosen to provide the third wall having the sufficiently high tear strength and/or forming the sufficiently low flow resistance.

Moreover, the third wall being porous may provide the advantage that the beverage can be drained from the capsule over substantially the entire cross section of the inner space. Hence, the beverage can flow out of the inner space very homogeneously. This may prevent the existence of preferential fluid flow paths inside the inner space. Preferential fluid flow paths are known to reduce reproducibility of the process of preparing the beverage.

Further, if the extractable product is roasted and ground coffee, providing the perforate and/or porous third wall, e.g. of filtering paper, provides the advantage that the third wall may filter oils from the beverage, i.e. from the coffee, before supplying the coffee to the container, such as the cup. This may be advantageous to remove oils from the coffee which adversely affect the taste and/or quality of the coffee. It is especially advantageous to filter cafestol from the coffee, since cafestol is understood to raise the blood cholesterol content. Thus, providing the flexible perforate and/or porous third wall may improve the quality of the coffee with respect to consumer health.

In an alternative preferred embodiment, the third wall is provided with a plurality of exit openings. Parameters of the third wall, such as density, thickness, number of exit openings, size and/or shape of exit openings, can easily be chosen to provide the third wall having the sufficiently high tear strength and/or forming the sufficiently low flow resistance.

Preferably, the plurality of exit openings is distributed over substantially the entire surface of the third wall. This provides the advantage that the beverage can be drained from the capsule over substantially the entire cross section of the inner space. Hence, the beverage can flow out of the inner space very homogeneously. This may prevent the occurrence of preferential fluid flow paths. Nevertheless, it is also possible that the exit openings are distributed over part of the surface of the third wall, the remainder of the surface of the third wall being free from exit openings. It is for instance possible that a circumferential area of the surface of the third wall is free from exit openings.

According to a second aspect of the invention, the second wall is perforate and/or porous. Preferably, the second wall has a sufficiently high tear strength and/or forms a sufficiently low flow resistance that the second wall, in use, does not tear and/or rupture and stays intact. This has the advantage that sudden pressure shocks to the third wall, e.g. caused by rupturing of the second wall, are prevented.

Preferably, the second wall is formed by a flexible porous sheet, such as a sheet of filtering paper, a flexible foil, such as a polymeric film, provided with a plurality of entrance openings, or the second wall is substantially rigid and comprises a plurality of entrance openings. Hence, the entrance filter can be provided in a simple manner.

In an embodiment, the plurality of entrance openings is distributed over substantially the entire surface of the foil or the second wall, respectively. This provides the advantage that the fluid can be supplied to substantially the entire cross section of the inner space. Hence, the extractable product is wetted very homogeneously. This further provides the advantage that the risk of preferential fluid flow paths occurring in the extractable product in the capsule is reduced and the reproducibility of the beverage strength is enhanced even more. Nevertheless, it is also possible that the entrance openings are distributed over part of the surface of the foil or the second wall, the remainder of the surface of the foil or the second wall being free from entrance openings. It will be appreciated that the porous second wall provides the same advantage.

In a further embodiment, the capsule is provided with a plurality of side-entrance openings arranged in the circumferential first wall. This provides the advantage that the extractable product is, at least partially, also wetted from the side. This provides the advantage that the fluid can be supplied to the extractable product in a very homogeneous and controlled manner.

According to a further aspect of the invention, the entire inner space is occupied by the extractable product. Hence, optimum use is made of the gain in internal volume of the capsule. This further provides the advantage that the extractable product cannot be displaced inside the inner space when the fluid flows through the capsule, so that no preferential paths can be formed.

In general, the second wall may be integral with the circumferential first wall. This provides the advantage that the capsule can simply be formed from a generally cup-shaped structure forming the circumferential first wall and the second wall in combination with the flexible sheet-shaped third wall. The third wall may be connected to the circumferential first wall, e.g. by means of gluing, welding, folding or the like.

In an embodiment the capsule comprises an inwardly extending rim, wherein the second wall or the third wall is attached to the inwardly extending rim. Hence it is possible to connect the, e.g. sheet-shaped, second wall or the third wall to the rim. Thus, a simple and sturdy construction of the capsule may be obtained.

In an embodiment the capsule comprises an outwardly extending rim, wherein the second wall or the third wall is attached to the outwardly extending rim. Hence it is possible to connect the, e.g. sheet-shaped, second wall or the third wall to the rim. Thus, a simple and sturdy construction of the capsule may be obtained.

More in general it applies that the third wall may extend to, e.g. a circumferential edge of, the circumferential first wall. Also, more in general it applies that the second wall may extend to, e.g. a circumferential edge of, the circumferential first wall.

In a special embodiment, the capsule further comprises a bottom seal at least partially removable connected to the second wall for sealing the, e.g. porous or perforate, second wall prior to use. Hence entering of air into the inner space via the, e.g. porous or perforate, second wall prior to use of the capsule may be prevented, improving shelf life of the product inside the capsule.

In a special embodiment, the capsule further comprises a lid seal at least partially removable connected to the third wall for sealing the third wall prior to use. Hence entering of air into the inner space via the third wall prior to use of the capsule may be prevented, improving shelf life of the product inside the capsule.

According to a further aspect of the invention, the lid seal is arranged to be partially released from the third wall under the effect of fluid pressure in the inner space, while remaining attached to the third wall at least one position. Hence, the lid seal need not be removed from the capsule by a user of the capsule. When the fluid enters the inner space pressure will build up until the seal partially releases from the third wall and the beverage can flow out through the third wall. The releasable connection may e.g. be formed as a so-called peel-seal. Since the lid seal is permanently attached to the third wall at least one position, the lid seal will not fully detach from the capsule. This has the advantage, that the lid seal will automatically be discarded from the apparatus when discarding the used capsule.

Preferably, the capsule comprises stiffening ribs integral with the circumferential first wall and/or the second wall to increase the rigidity of the capsule.

In general, the circumferential first wall may have any shape such as cylindrical, hemispherical, frustoconical or polygonal, such as hexagonal or octagonal.

Preferably, the extractable product comprises roasted and ground coffee. Thus, the capsule is suited for preparing a predetermined amount of coffee by supplying a predetermined amount of hot water under high pressure to the capsule.

According to a further aspect of the invention, the extractable product is compacted into a tablet. This provides the advantage that the risk of preferential flow paths occurring in the compacted extractable product tablet is reduced. It will be appreciated that when using the compacted tablet, the second wall may be omitted from the capsule, as the risk of spilling extractable product is greatly reduced.

Preferably, the tablet comprises at least one bore extending from the side of the tablet facing the second wall in the direction of the third wall. The bore thus provides an infusion means for wetting the tablet in a homogeneous manner.

It is also possible that the extractable product is compacted into a plurality of tablets, preferably of mutually different packing density. It is for instance possible that the extractable product is provided as a single stack of tablets having mutually different degrees of compacting. It is for instance possible that the degree of compacting increases per tablet in the direction from the second wall to the third wall. In this way the effort required to completely wet a tablet will also increase in the direction from the second wall to the third, ensuring that each upstream tablet has been properly wetted when wetting a more downstream tablet, thus providing very homogeneous wetting of the total volume of extractable product.

BRIEF DESCRIPTION OF THE DRAWINGS

The invention will now be further elucidated by means of, non-limiting, examples referring to the schematic figures in the enclosed drawing, in which.

DESCRIPTION OF EXEMPLARY EMBODIMENTS

Figure 1A:
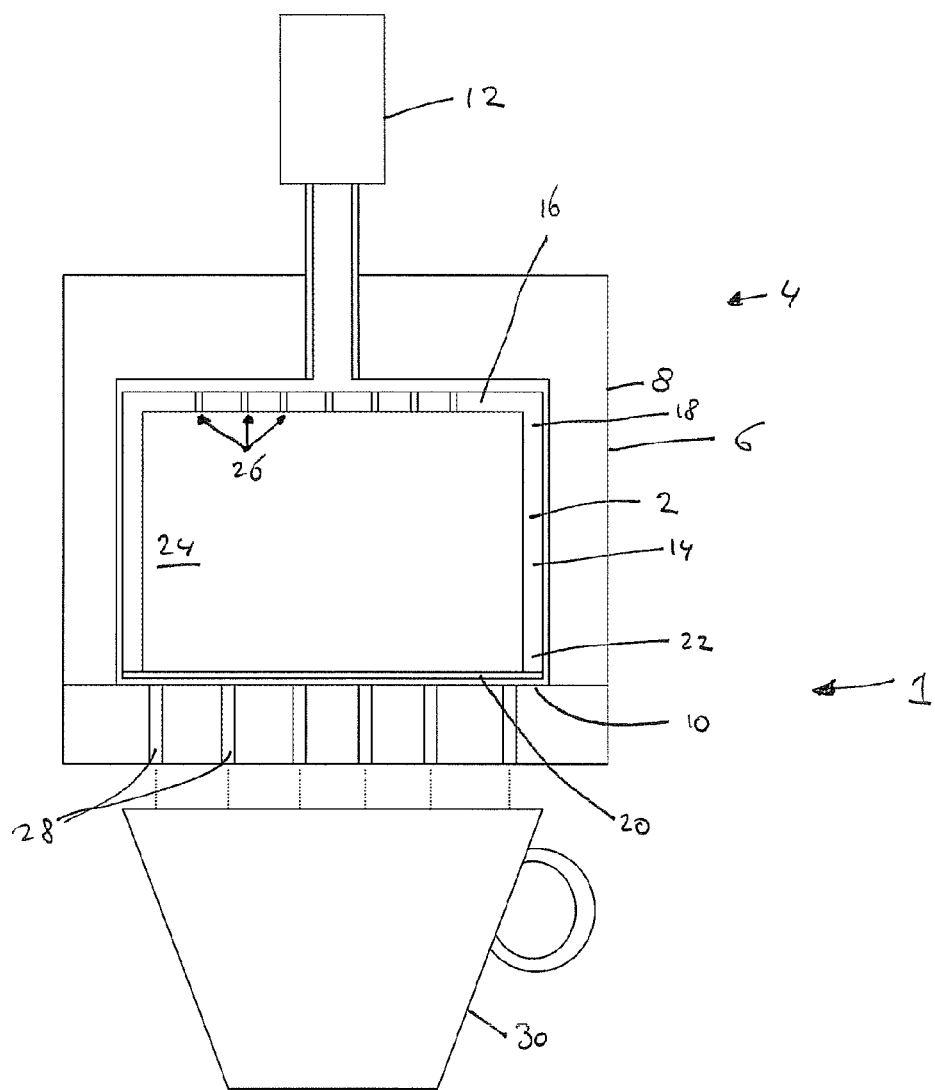
FIG. 1a shows an example of a first embodiment of a system for preparing a beverage according to the invention.

FIG. 1a shows an example of a first embodiment of a system 1 for preparing a predetermined quantity of beverage suitable for consumption using an extractable product according to the invention. The system 1 comprises an exchangeable open capsule 2, and an apparatus 4. The apparatus 4 comprises a receptacle 6 for holding the exchangeable capsule 2. In FIG. 1a a gap is drawn between the capsule 2 and the receptacle 6 for clarity. It will be appreciated that, in use, the capsule 2 may lie in contact with the receptacle 6. In this example the receptacle 6 has a shape complementary to the shape of the capsule 2. In this example the receptacle 6 comprises an upper part 8 and a support surface 10.

The apparatus 4 further comprises a fluid dispensing device 12 for supplying an amount of a fluid, such as hot water, under a high pressure, of e.g. more than approximately six bars (absolute pressure), to the exchangeable capsule 2.

In the system 1 shown in FIG. 1a, the exchangeable capsule 2 comprises a substantially rigid circumferential first wall 14, a second wall 16 closing the circumferential first wall 14 at a first end 18, and a third wall 20 closing the circumferential first wall 14 at a second, open, end 22 opposite the second wall 16. The circumferential first wall 14, the second wall 16 and the third wall 20 enclose an inner space 24 comprising the extractable product, in this example roasted and ground coffee. In this example, the exchangeable capsule 2 comprises an amount of extractable product, e.g. approximately 7 grams of roasted and ground coffee, suitable for preparing a single portion of the beverage, preferably a single cup of the beverage, e.g. from 30-200 ml of the prepared beverage. The exchangeable capsule, thus, is a single-portion-pack.

In the example of FIG. 1a, the circumferential first wall 14 is substantially rigid. The circumferential first wall 14 may e.g. comprise a plastics material and may be formed by e.g. injection moulding, vacuum-forming, thermoforming or the like.

In this example the second wall 16 is integral with the circumferential first wall 14. In this example the second wall 16 is substantially rigid. Here the second wall 16 comprises a plurality of entrance openings 26 for allowing the fluid to enter the capsule 2.

In this example the third wall 20 is flexible and sheet-shaped. Further, in this example the third wall is porous. The third wall 20 is in this example manufactured from a woven or nonwoven filtering material, such as filtering paper. In this example the woven or nonwoven filtering material, such as the filtering paper, comprises polyethylene (PE) fibres. Hence, the woven or nonwoven filtering material is a fibrous material. In this example the third wall 20 is connected to the circumferential first wall 14 by heat sealing. In this example the third wall 20 forms an outermost boundary of the capsule 2 in an axial direction thereof. It can be seen from FIG. 1a that the third wall 20 abuts against the support surface 10 of the receptacle 6.

The system 1 shown in FIG. 1a is operated as follows for preparing a cup of coffee.

The capsule 2 is placed in the receptacle 6. The third wall 20 is brought into abutment with the support surface 10. The fluid, here hot water under pressure, is supplied to the extractable product in the inner space 24 through the entrance openings 26. The water will wet the coffee grounds and extract the desired substances to form the coffee beverage. The prepared coffee will drain from the capsule 2 through the porous third wall 20. The coffee beverage is further drained from the receptacle 6 via a plurality of outlets 28, and may be supplied to a container 30 such as a cup.

In the example of FIG. 1a the plurality of entrance openings 26 is distributed over substantially the entire second wall 16. Thus, the fluid is supplied to the extractable product via the plurality of entrance openings 26, which causes the extractable product to be wetted over substantially the entire cross section of the capsule 2. Hence, a very homogeneous supply of fluid to the extractable product is obtained. Thus, the risk of occurrence of preferential paths via which the fluid flows through the extractable product is greatly reduced.

In the example of FIG. 1a the third wall 20, forming an exit area of the capsule 2, through which the beverage, here coffee, can drain from the capsule, is formed by a porous sheet in the form of a woven or nonwoven filtering material, such as filtering paper. In this example the entire third wall 20 is formed as the porous sheet. In this example the third wall 20 forms a substantially continuous fluid-permeable sheet spanning substantially the entire second open end 22 of the capsule 2. Thus, the fluid can drain from the capsule 2 over a large area. Hence, a very homogeneous drain of beverage from the extractable product is obtained. Thus, the risk of occurrence of preferential paths via which the fluid flows through the extractable product is greatly reduced.

Figure 1B:
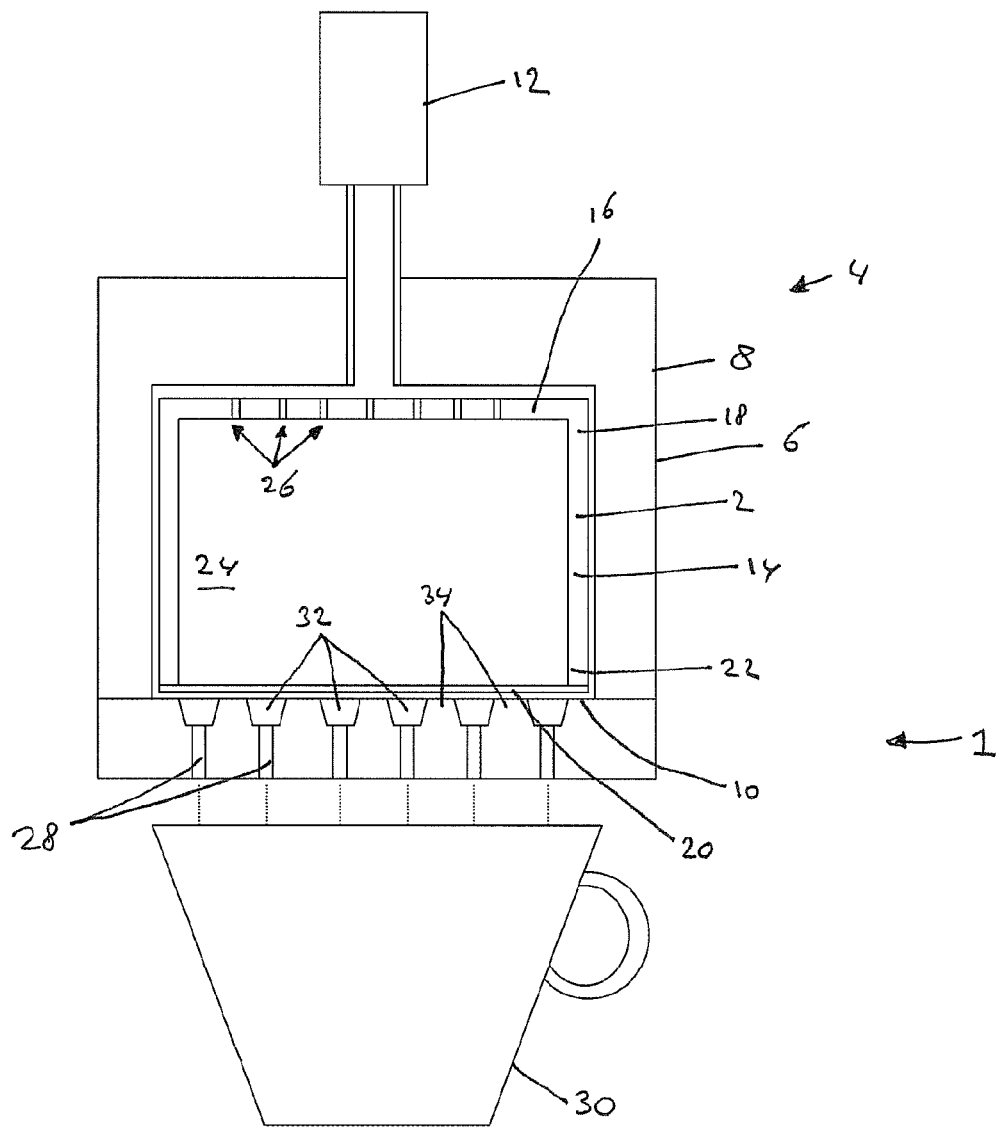
FIG. 1b shows an example of a second embodiment of a system for preparing a beverage according to the invention.

FIG. 1b shows an example of a second embodiment of a system 1 for preparing predetermined quantity of beverage suitable for consumption using an extractable product according to the invention. The system shown in FIG. 1b is to a great extent identical to the system shown in FIG. 1a. Like elements are referred to with like reference numerals.

In the example of FIG. 1b, the support surface 10 comprises channel shaped grooves 32 in a side facing the third wall 20, for draining the prepared beverage from the capsule 2 through the grooves 32. In between the grooves 32 are ridges 34. The third wall 20 abutting against the support surface 10, hence, abuts against the ridges 34. It will be appreciated that in the example of FIG. 1b, the prepared beverage can be drained from the capsule 2 through the third wall 20 into the channel shaped grooves 32. This provides improved outflow of the beverage out of the capsule 2.

The third wall 20 is arranged not to tear against the ridges 34, e.g. to having a sufficiently high tear strength not to tear against the ridges 34 under the influence of the fluid pressure inside the capsule 2. Alternatively, or additionally, the third wall 20 forms a sufficiently low flow resistance for the beverage exiting the capsule 2, that the third wall 20 is not pressed against the ridges 34 with sufficient force to tear against the ridges 34, so that the third wall 20 stays intact. It will be appreciated that the third wall 20 may deform against the ridges 34 under the influence of pressure of the fluid and/or beverage inside the inner space, but it will not rupture or tear.

Figure 2B:
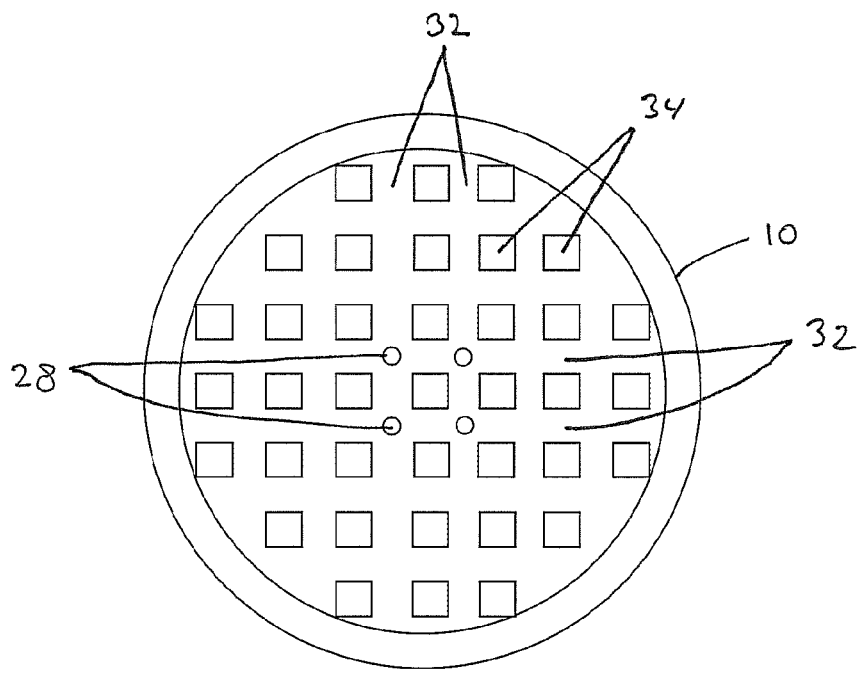
FIGS. 2a and 2b show possible embodiments of the support surface of the system according to the invention.
Figure 2A:
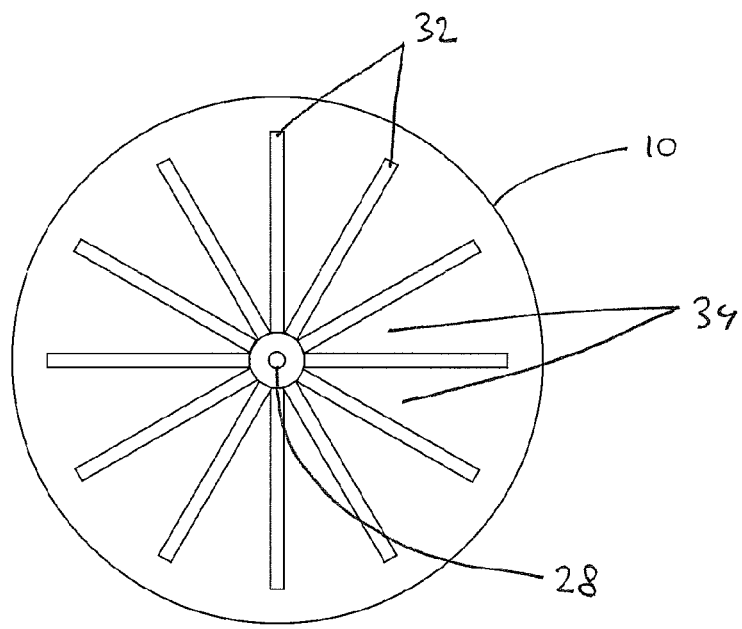

FIGS. 2a and 2b show plan views of embodiments of the support surface 10 of the receptacle 6.

In the example of FIG. 2a the support surface 10 comprises a plurality of radially oriented grooves 32, radially separated by the ridges 34. The radial grooves 32 communicate in the centre of the support surface 10. Also in the centre of the support surface is provided a single outlet 28 for allowing the beverage to flow through the support surface, e.g. to the container 30 as indicated in FIG. 1b.

In the example of FIG. 2b the support surface 10 comprises a plurality of mutually orthogonally oriented grooves 32. In this example the ridges 34 are formed by "islands" between the grooves 32. In this example the islands are substantially square, although other shapes are possible, such as rectangular, circular, triangular, elongate or droplet-shaped. It will be appreciated that in this example, the ridges 34 form approximately 25% of the portion of the support surface 10 which, in use, coincides with the portion of the surface area of the third wall 20 overlying the second, open, end 22. In this example, the third wall 20 is supported by the ridges 34 over approximately 25% of the portion the surface area of the third wall 20 overlying the second, open, end 22. Thus, the third wall 20 is well supported, providing that the third wall does not tear or rupture when the fluid is supplied to the capsule 2 under pressure.

In the examples of 2a and 2b, the ridges 34 comprise edges which are not sharp. Thus, the edges of the ridges will not cut the third wall. In these examples a radius of curvature of the edges is approximately 50 m, although other radii are conceivable, such as 100, 200 or 500 m.

In a not shown embodiment, the ridges 34 are provided with a convex top. Hence, when the third wall 20 is pressed against the ridges 34, the surface area over which the third wall 20 is supported by the ridges 34 increases, thus reducing the local pressure exerted on the third wall 20 by the ridges 34. Thus it is possible to provide, in an easy manner, that the third wall, in use, does not tear and/or rupture and stays intact. As an example of such convex ridges, it is for instance possible that the islands shown in FIG. 2b are dome-shaped.

In this example the support surface comprises a plurality of outlets 28.

It will be appreciated that alternative configurations of the channel-shaped grooves 32 are possible. Such alternatives comprise concentric grooves, parallel grooves, one or more spiral-shaped grooves, combinations of these and/or the shown grooves, etc. It will also be appreciated that, in general, the support surface 10 may comprise one or a plurality of outlets 28.

FIGS. 3a-3d show embodiments of capsules 2 according to the invention.

Figure 3A:
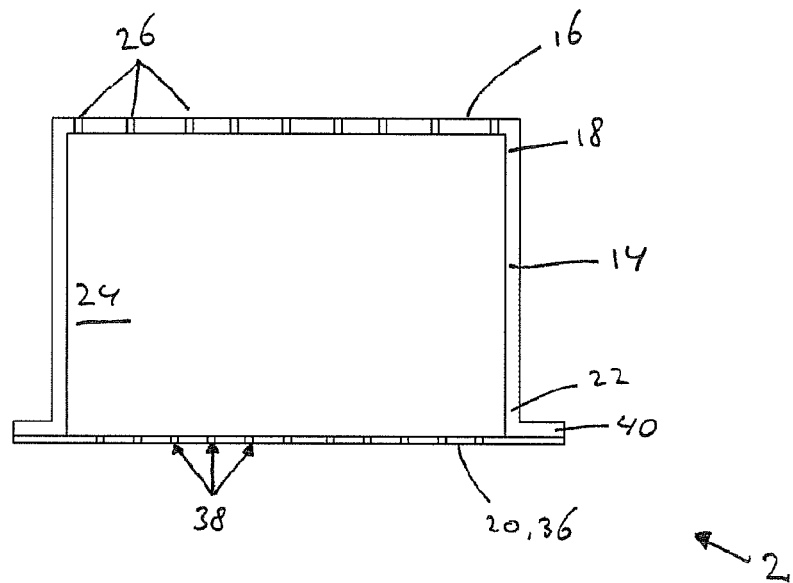
FIGS. 3a, 3b, 3c, 3d show embodiments of capsules according to the invention.

In FIG. 3a the second wall 16 is integral with the circumferential first wall 14 like in FIGS. 1a and 1b. The second wall 16 comprises the plurality of entrance openings 26 in the second wall 16. The third wall 20 is formed by a flexible foil 36 provided with a plurality of exit openings 38. In FIG. 3a the capsule 2 comprises an outwardly extending rim 40 at the second end 22 of the circumferential first wall 14. The third wall 20 is attached to the outwardly extending rim 40, e.g. by means of gluing, welding, heat sealing, or the like. Hence, the third wall can be firmly attached to the rim. It will be appreciated that it is possible that the outwardly extending rim 40 extends between the upper part 8 of the receptacle 6 and the support surface 10 of the receptacle 6, such that the rim 40 is clamped between the upper part 8 and the support surface 10. Hence, the third wall 20 is clamped against the rim 40 in use, i.e. when the fluid pressure is applied, thus reducing the risk of the third wall 20 separating from the rim 40.

Figure 3B:
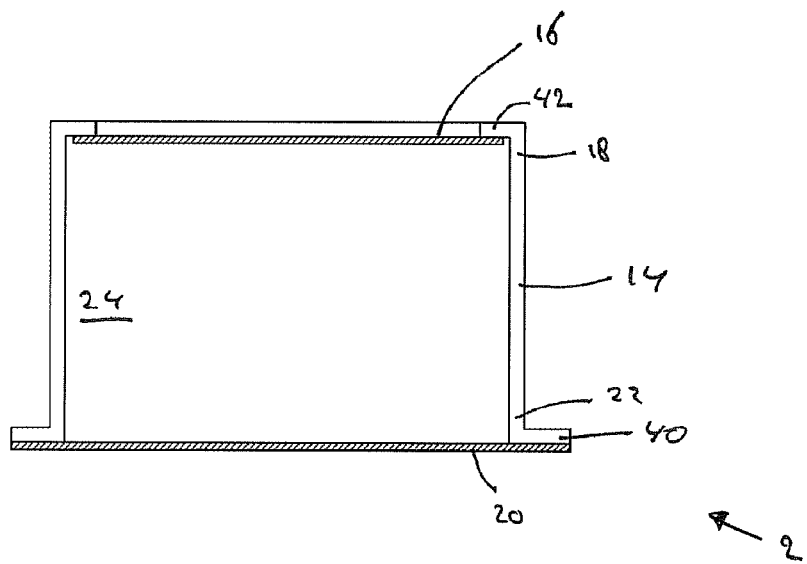

In FIG. 3b the third wall 20 is formed by a woven or nonwoven filtering material, such as filtering paper, like in FIGS. 1a and 1b. In FIG. 3b the second wall 16 is also formed by a flexible porous sheet, such as filter paper. In this example the second wall 16 is attached to an inwardly extending flange 42. In this example, the second wall 16 is attached to the inner side of the inwardly extending flange 42.

Figure 3C:
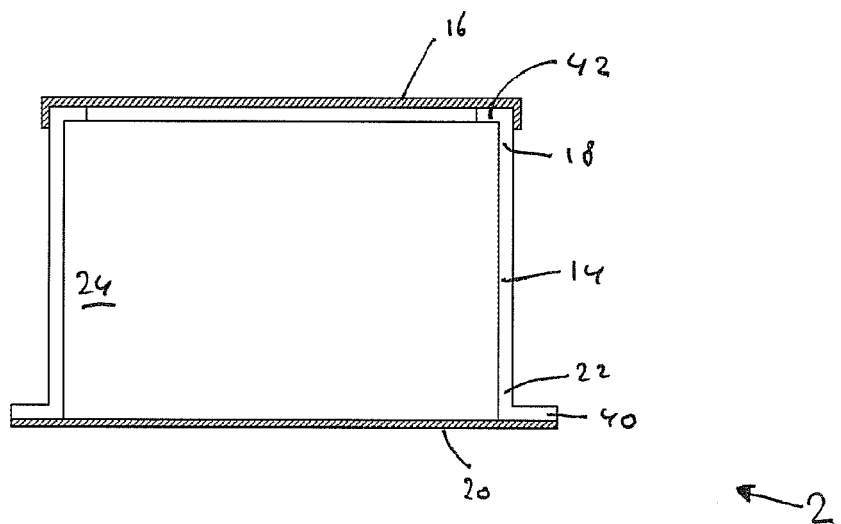

In FIG. 3c the third wall 20 is formed by a woven or nonwoven filtering material, such as filtering paper, like in FIGS. 1a, 1b and 3b. In FIG. 3c the second wall 16 is also formed by a porous sheet, such as filter paper. In this example, the second wall 16 is attached to the outer side of the inwardly extending flange 42. Hence, the risk is reduced that the fluid under pressure tears the second wall 16 from the inwardly extending flange 42. It is possible that the second wall 16 overhangs a circumferential edge of the capsule 2. Hence, a larger surface area is available for attaching the second wall 16 to the inwardly extending rim 42 and the circumferential first wall 10, resulting in a stronger bond.

Figure 3D:
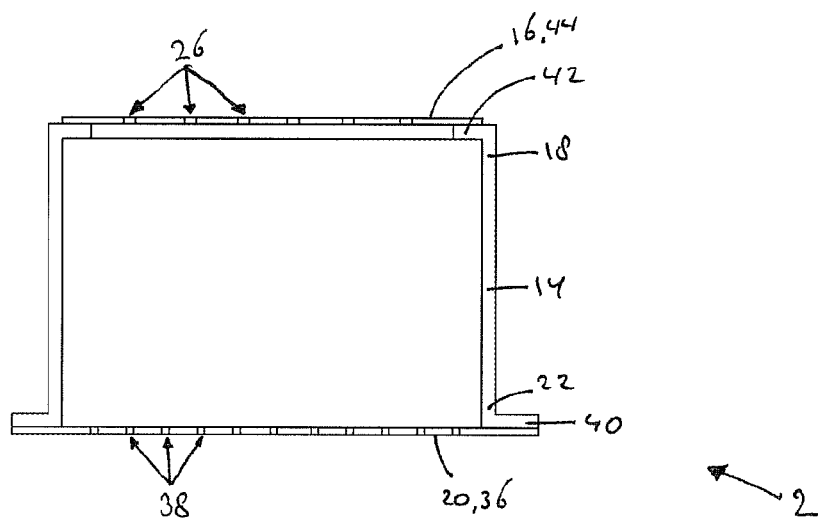

In FIG. 3d the third wall 20 is provided with the plurality of exit openings 30, as in FIG. 3a. In FIG. 3d the second wall 16 is also formed by a foil 44, provided with the plurality of entrance openings 26.

In all embodiments of FIGS. 3a-3d the third wall 20 is formed by a woven or nonwoven filtering material, such as filtering paper. More specifically, in all embodiments of FIGS. 3a-3d the entire third wall 20 is solely formed by the woven or nonwoven filtering material, such as the filtering paper. It has been found that in general no supporting structure, such as a substantially rigid grid e.g. downstream of the third wall, is required to support the third wall 20 to prevent the third wall from tearing an/or rupturing, as the capsule is arranged such that the third wall 20 abuts against the support surface 10 of the receptacle 6 of the apparatus 4 of the system 1. It will be clear that all embodiments of the capsule 2, shown in FIGS. 3a-3d, may be used in conjunction with the support surface 10 having the channel-shaped grooves 32. It will be appreciated that simple tests will indicate parameters, such as material, thickness, presence of exit openings, dimension of exit openings, number of exit openings etc. of the third wall which provide that the third wall 20 of the capsule 2 has a sufficiently high tear strength and/or forms a sufficiently low flow resistance that the third wall, in use, does not tear and/or rupture and stays intact.

In all embodiments of FIGS. 3b-3d the second wall 16 is formed by a flexible sheet-shaped material. More specifically, in all embodiments of FIGS. 3b-3d the second wall is solely formed by the flexible sheet-shaped material. It has been found that in general no supporting structure, such as a substantially rigid grid, e.g. downstream of the second wall, is required to support the second wall to prevent the second wall 16 from tearing an/or rupturing.

In all embodiments of FIGS. 3a-3d the third wall forms the outermost boundary of the capsule in the axial direction thereof.

It will be appreciated that the capsule 2 may comprise any second wall 16 according to any one of the shown embodiments in combination with any third wall 20 according to any one of the shown embodiments.

In FIGS. 3a-3d (and 4a, 5a and 5b) the rim near the second end 22 extends outwardly. It will be appreciated that the capsule 2 may alternatively, or additionally, comprise a rim extending inwardly near the second end 22 for attaching the third wall 20 thereto. In FIGS. 3b-3d (and 5a and 5b) the rim near the first end 18 extends inwardly. It will be appreciated that the capsule 2 may alternatively, or additionally, comprise a rim extending outwardly near the first end 18 for attaching the second wall 16 thereto.

In general, the exit openings 38 of the sheet, or pores of the porous sheet, are dimensioned such that a dimension of the opening 38 or pore is sufficiently small to retain the extractable product, such as ground coffee, inside the capsule 2. Also in general, the entrance openings 26 of the second wall, or pores of the porous sheet, are dimensioned such that a dimension of the opening 26 or pore is sufficiently small to retain the extractable product, such as ground coffee, inside the capsule 2.

In general, the entrance openings 26 are preferably distributed over substantially the entire surface of the second wall 16, at least substantially the entire surface of the opening defined by the inwardly extending rim 42. Optionally, entrance openings 26 are also present in the circumferential first wall 14, e.g. in the portion of the circumferential first wall 14 near the first end 18. This allows homogeneous supply of the fluid to the extractable product inside the capsule 2.

In general, the exit openings 38 are preferably distributed over substantially the entire surface of the third wall, at least substantially the entire surface of the opening defined by the outwardly extending rim 40. This allows homogeneous draining of the beverage from the extractable product inside the capsule 2.

In the examples of FIGS. 1a, 1b, and 3a-3d the entrance openings 26 and exit openings 38 have a circular cross section. The openings 26,38 with circular cross section are easily manufactured. Optionally, the cross section of the entrance openings 26 tapers (narrows) towards the inner space 24. This provides the advantage that the entrance openings act as nozzles that cause a jet of fluid to enter the inner space 24.

It will be appreciated that the entrance openings 26 and/or exit openings 38 may also have alternative shapes. The openings 26,38 may for instance have the shape of elongate slits. Preferably, the small dimension of the slits is sufficiently small to retain the extractable product inside the capsule 2.

In a special embodiment, the slits may have a shape that defines a tongue in the plane of the second wall 16. The slits may then be substantially U-shaped, such as semi-circular, horse-shoe shaped, rectangular or V-shaped. This has the advantage that the tongue may be bent out of the plane of the second wall 16 under the effect of the flow of fluid through the opening defined by the tongue. Thus, a larger volume flow of fluid may be attained. If the second wall is made of a resilient material, the tongue will bend back into the plane of the second wall once the flow of fluid stops, thus preventing the spilling of extractable product (prior to and) after preparation of the beverage.

Figure 4A:
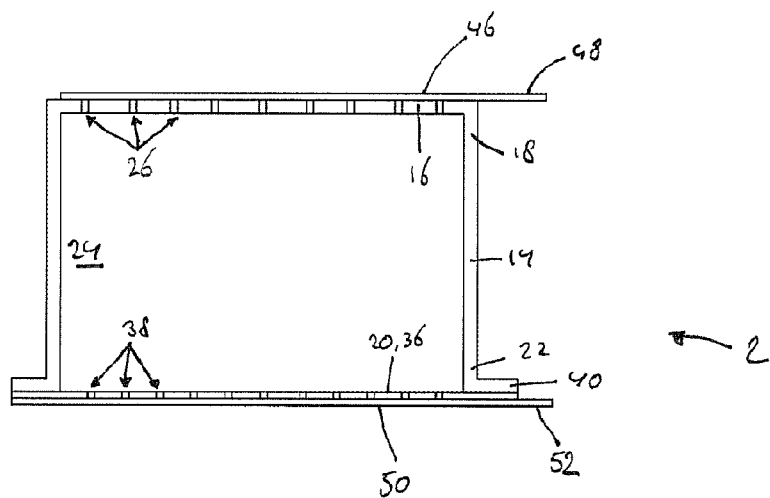
FIGS. 4a, 4b and 4c show examples of further embodiments of a capsule according to the invention.

FIG. 4a shows an example of a further embodiment of a capsule 2 according to the invention. FIG. 4a shows a modification of the capsule shown in FIG. 3a. It will be appreciated that this modification may be applied to any capsule 2 referred to hereinabove. In the example of FIG. 4a the capsule 2 further comprises a bottom seal 46. The bottom seal 46 closes off the entrance openings 26 (or the porous sheet) prior to use. The bottom seal 46 is at least partially removable connected to the second wall 16. In this example the bottom seal 46 comprises a lip 48 to allow easy removal of the bottom seal 46 by a user of the capsule 2. In FIG. 4a the capsule 2 further comprises a lid seal 50. The lid seal 50 closes off the exit openings 38 (or the porous sheet) prior to use. The lid seal 50 is at least partially removable connected to the third wall 20. In this example the lid seal 50 comprises a lip 52 to allow easy removal of the lid seal 50 by a user of the capsule 2. The bottom seal 46 and lid seal 50 improve shelf life of the product inside the capsule by preventing air to enter the capsule via the openings 26,38 or porous sheet.

In a special embodiment (not shown) the lip 46 of the bottom seal 46 is connected to the lip 52 of the lid seal 50. Thus, the bottom seal 46 and the lid seal 50 can be made unitary. Hence, it may be prevented that a user accidentally forgets to remove one of the bottom seal and the lid seal.

Figure 4B:
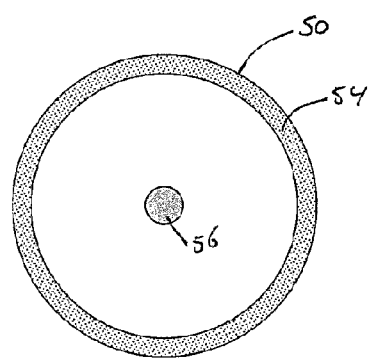
Figure 4C:
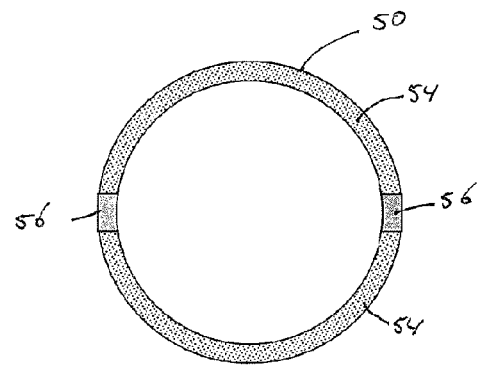

FIGS. 4b and 4c shows an example of a plan view of a further embodiment of the capsule 2 when viewed from the side of the third wall. In FIGS. 4b and 4c the capsule comprises the lid seal 50. The lid seal 50 is attached to the third wall 20 with a releasable seal 54. In this example the releasable seal forms a circumferential seal adjacent a circumferential edge of the third wall 20. The releasable seal 54 is arranged to be released from the third wall 20 under the effect of fluid pressure in the inner space 24. The releasable seal may e.g. be a peel-seal of predetermined release-strength. Hence, it is not required that the user removes the lid seal 50 from the capsule 2, as the seal is opened automatically while preparing the beverage.

In FIGS. 4b and 4c the lid seal 50 is further attached to the third wall 20 with a permanent connection 56. The permanent connection may e.g. a glued or welded connection. In FIG. 4b the permanent connection is positioned adjacent the centre of the third wall 20. In FIG. 4c the permanent connection 56 is positioned adjacent the circumferential edge of the third wall 20. This provides the advantage that the releasable seal may be released under the effect of pressure for allowing the draining of the beverage from the capsule, while the lid seal 50 remains attached to the third wall 20 at least one position. Hence, the lid seal 50 need not be discarded separately, improving ease of use, and cannot be lost.

It will be appreciated that instead of, or in addition to, being attached to the third wall 20, the lid seal 50 may also be attached to the rim positioned near the second end 22, and/or to the circumferential first wall.

It will be appreciated that the capsule 2 may in a similar way alternatively, or additionally be provided with the bottom seal 46, e.g. positioned on the inner side of the second wall 16, arranged to be released from the second wall 16 under the effect of pressure of fluid supplied to the capsule 2, and optionally provided with at least one permanent connection between the second wall and the bottom seal 46. It will be appreciated that instead of, or in addition to, being attached to the second wall 16, the bottom seal 46 may also be attached to the rim positioned near the first end 18, and/or to the circumferential first wall.

It will also be appreciated that the lid seal 50 and/or the bottom seal 46 may also be used in conjunction with alternative capsules, wherein the third wall does not form an outermost boundary of the capsule in the axial direction thereof, e.g. a capsule having an axially extending rim extending beyond the third wall.

Preferably, the circumferential first wall 14 is substantially rigid. Hence, the capsule will not be prone to deform by shipping and/or handling, so that the capsule 2 will always fit in the receptacle 6. In addition, the circumferential first wall 14 is preferably resilient, so that any possible deformation of the circumferential first wall will be reversed once the force causing the deformation is removed. In order to improve rigidity of the capsule 2, the capsule 2 may comprise stiffening ribs integral with the circumferential first wall 14. The stiffening ribs may extend from the first end 18 towards the second end 22. Alternatively, or additionally, the stiffening ribs may extend in a circumferential direction. When the second wall 16 is integral with the circumferential first wall 14, the stiffening ribs may also be integral with the second wall 16.

Nevertheless, it is possible that the circumferential first wall is formed by a flexible sheet, preferably integral with the second wall. Hence, substantially the entire capsule may be manufactured of the flexible sheet, reducing the amount of material required for providing the capsule. Optionally, at least one of the rims 40,42 may be substantially rigid to enhance ease of handling of the capsule.

In the examples the circumferential first wall is substantially cylindrical. It will be appreciated that the capsule according to the invention is not limited to this shape. The circumferential first wall may e.g. be frustoconical, hemispherical, or polygonal, such as hexagonal, octagonal, etc.

Figure 5A:
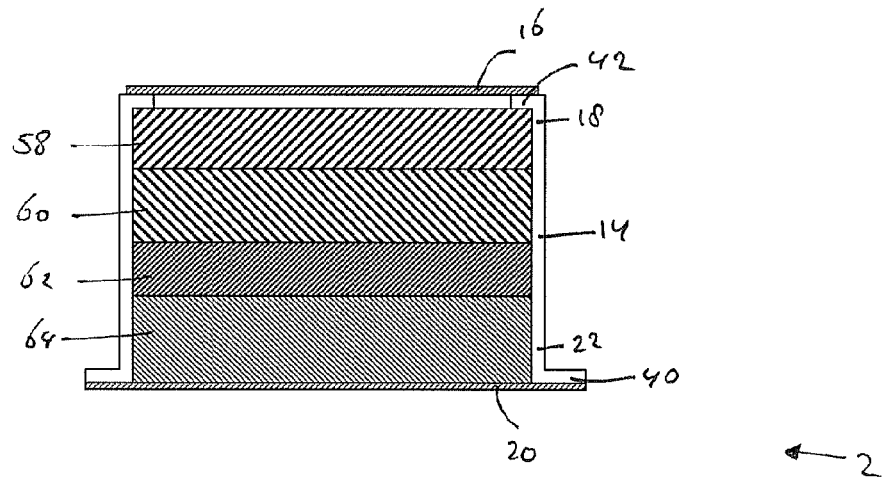
FIGS. 5a and 5b show examples of even further embodiments of a capsule according to the invention.

According to a further aspect of the invention, the extractable product in the inner space 24 is compacted. FIG. 5a shows an example wherein the extractable product is compacted into a plurality of, in this example four, tablets 58,60, 62,64. In FIG. 5a the tablets are stacked inside the inner space 24. In FIG. 5a, each tablet 58,60,62,64 spans substantially the entire cross section of the inner space 24 of the capsule 2. In this example a density, i.e. a degree of compaction, of the tablets is different for each of the tablets. The density of the tablets 58,60,62,64 increases in the direction from the second wall 16 to the third wall 20. This provides the advantage that the fluid will more easily wet a tablet of lower density than a tablet of higher density, so that each upstream tablet has been properly wetted while the water wets a subsequent downstream tablet. Thus, highly homogeneous wetting of the extractable product is achieved. Although the example shows four stacked tablets, it will be appreciated that any number of tablets may be used. In an advanced embodiment, it is possible that a separation sheet is interposed in between two adjacent tablets. The separation sheet may be porous and/or perforate. The separation sheet may e.g. be a plastics foil provided with openings. The separation sheet may also be a woven or nonwoven filtering material, such as filtering paper, sheet.

Figure 5B:
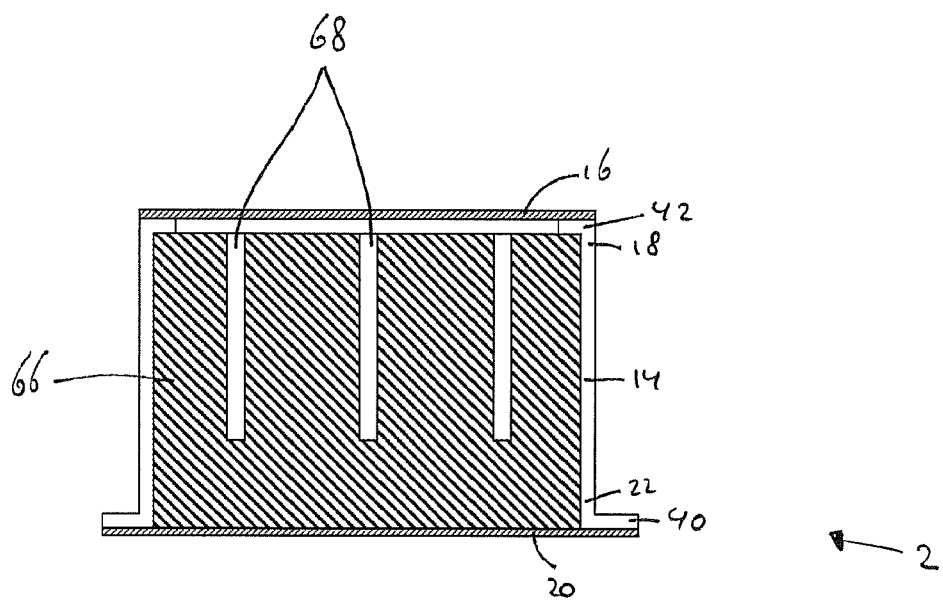

FIG. 5b shows an example of a capsule 2 comprising a single tablet 66 of compacted extractable product. In the example of FIG. 5b the tablet 66 comprises bores 68 extending into the tablet 66 from the side of the tablet 66 facing the second wall 16 in the direction of the third wall 20. The length of the bores 68 is shorter than the thickness of the tablet 66 in the direction along the bore 68. Thus, the bores 68 do not form shortcut passages for the fluid through the tablet 66, but provide the fluid a passage into the core of the tablet 66. These bores 68 allow a predetermined penetration of the fluid into the tablet. Thus, a preferred wetting of the compacted extractable product may be obtained.

In the examples of FIGS. 5a and 5b the second wall 16 and third wall 20 of the capsule are substantially as shown in FIG. 3c. It will be appreciated that the tablet 66 or plurality of tablets 58,60,62,64 may be used in conjunction with any capsule 2 referred to hereinabove. It will also be appreciated that if the extractable product is compacted into the tablet(s) the second wall 16 of the capsule is not strictly required, since the extractable product is not likely to spill from the capsule 2 prior to use.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule 2 is contained in an air-tight wrapping prior to use to improve shelf-life.

It is for instance possible that the capsule 2 is manufactured form biodegradable materials.

In the examples the third wall is a substantially homogeneous porous and/or perforate sheet. It is also possible that the porosity and/or perforation distribution is not homogeneous. It is for instance possible that only a portion of the third wall is porous. Thereto the porous sheet may e.g. be partially covered, coated or impregnated with a nonporous material. It is also possible that only a portion of the third wall is perforated. Such porous and/or perforate portion may e.g. be a central portion or a ring-shaped portion of the third wall. It is also possible that a first portion of the third wall is porous, whereas a second portion of the third wall is perforate.

In the examples the second wall is a substantially homogeneously porous and/or perforate. It is also possible that the porosity and/or perforation distribution is not homogeneous. It is for instance possible that only a portion of the second wall is porous. Thereto the porous material may e.g. be partially covered, coated or impregnated with a nonporous material. It is also possible that only a portion of the second wall is perforated. Such porous and/or perforate portion may e.g. be a central portion or a ring-shaped portion of the second wall. It is also possible that a first portion of the second wall is porous, whereas a second portion of the second wall is perforate.

As examples of practical embodiments of capsules according to the invention, the following characteristics may apply to such capsules. The circumferential first wall may be substantially frustoconical having dimensions in the order of about 24 millimeter axial length, outside diameter of about 25 millimeter at the first end, and outside diameter of about 30 millimeter at the second end. Whether or not such frustoconical shape is applied, one or both of the circumferential first wall and the second wall may be of polypropene having a wall thickness, apart from local variations such as ribs, between 0.5 and 0.9 millimeter, preferably between 0.65 and 0.75 millimeter, more preferably 0.7 millimeter. The second wall may then be integral with the circumferential first wall.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for preparing a predetermined quantity of beverage suitable for consumption using an extractable product, the system comprising:
   an exchangeable capsule; and
   an apparatus comprising a fluid dispensing device for supplying an amount of a fluid, under a pressure of at least six bar to the exchangeable capsule, and a receptacle for holding the exchangeable capsule;
   wherein the exchangeable capsule comprises:
      a circumferential first wall, wherein the circumferential first wall is frustoconical,
      a second wall closing the circumferential first wall at a first end, wherein the second wall is integral with the circumferential first wall,
      a flexible sheet-shaped perforate and/or porous third wall closing the circumferential first wall at a second, open, end opposite the second wall, and
      an outwardly extending rim, wherein the third wall is attached to the outwardly extending rim,
      wherein the first, second, and third wall enclose an inner space comprising the extractable product,
      wherein the third wall forms an outermost boundary of the capsule in an axial direction thereof, and
      wherein the third wall comprises filtering paper or a nonwoven filtering material;
   wherein the fluid dispensing device is arranged for supplying the fluid to the extractable product under the pressure of at least six bar through the second wall for forming the beverage;
   wherein the receptacle comprises a support surface, and the third wall is arranged to abut against the support surface for draining the prepared beverage from the capsule through the third wall and through the support surface;
   wherein the support surface comprises an abutting area intended for said abutment with the third wall, which abutting area comprises ridges having a substantially non-straight form;
   wherein channel shaped grooves are formed between the ridges in a side of the support surface facing the third wall, for draining the prepared beverage from the capsule through the grooves;
   wherein the ridges have a convex top;
   wherein the ridges comprise edges;
   wherein the edges are not sharp; and wherein the edges have a radius of curvature of at least 50 μm.

2. The system according to claim 1, wherein the third wall has a sufficiently high tear strength and/or forms a sufficiently low flow resistance that the third wall, in use, does not tear and/or rupture and stays intact.

3. The system according to claim 1, wherein the capsule is free from a support structure for supporting the third wall downstream of the third wall.

4. The system according to claim 1, wherein the third wall is provided with a plurality of exit openings.

5. The system according to claim 4, wherein the plurality of exit openings is distributed over substantially the entire surface of the third wall.

6. The system according to claim 1, wherein the second wall is perforate and/or porous.

7. The system according to claim 6, wherein the second wall has a sufficiently high tear strength and/or forms a sufficiently low flow resistance that the second wall, in use, does not tear and/or rupture and stays intact.

8. The system according to claim 1, wherein the second wall is formed by:
a flexible porous sheet,
a flexible foil provided with a plurality of entrance openings, or
wherein the second wall is substantially rigid and comprises a plurality of entrance openings.

9. The system according to claim 8, wherein the plurality of entrance openings is distributed over substantially the entire surface of the foil or the second wall, respectively.

10. The system according to claim 1, wherein the capsule is provided with a plurality of side-entrance openings arranged in the circumferential first wall.

11. The system according to claim 7, wherein the entrance openings and/or side-entrance openings have a circular cross section.

12. The system according to claim 11, wherein the cross section of the entrance openings and/or side-entrance openings tapers towards the inner space.

13. The system according to claim 8, wherein the entrance openings and/or side-entrance openings are slits.

14. The system according to claim 8, wherein the entrance openings and/or side-entrance openings are arranged to open under fluid pressure.

15. The system according to claim 1, wherein the entire inner space is occupied by the extractable product.

16. The system according to claim 1, wherein the capsule comprises an inwardly extending rim, wherein the second wall or the third wall is attached to the inwardly extended rim.

17. The system according to claim 1, wherein the second wall and/ or the third wall extends to the circumferential first wall.

18. The system according to claim 1, wherein the capsule further comprises a bottom seal at least partially removable connected to the second wall for sealing the second wall prior to use.

19. The system according to claim 1, wherein the capsule further comprises a lid seal at least partially removable connected to the third wall for sealing the third wall prior to use.

20. The system according to claim 19, wherein the lid seal is arranged to be partially released from the third wall under the effect of fluid pressure in the inner space, while remaining attached to the third wall at at least one position.

21. The system according to claim 1, wherein the capsule comprises stiffening ribs integral with the circumferential first wall.

22. The system according to claim 1, wherein the extractable product comprises roasted and ground coffee.

23. The system according to claim 1, wherein the extractable product is compacted into a tablet.

24. The system according to claim 23, wherein the tablet comprises at least one bore extending from the side of the tablet facing the second wall in the direction of the third wall.

25. The system according to claim 1, wherein the extractable product is compacted into a plurality of tablets.

26. The system according to claim 1, wherein the circumferential first wall is substantially rigid.

27. The system according to claim 1, wherein the ridges and the third wall are adapted to each other such that the third wall, in use, does not tear or rupture against the ridges.

28. The system according to claim 1, wherein the third wall is adapted to the ridges such that the third wall, in use, does not tear or rupture against the ridges.

29. The system according to claim 1, wherein the ridges form at least 10 % of the portion of the support surface which, in use, coincides with the portion of the surface area of the third wall overlying the second, open, end.

30. The system according to claim 1, wherein, in use, the third wall is supported by the ridges over at least 10 % of the portion the surface area of the third wall overlying the second, open, end.

31. A method for preparing a predetermined quantity of beverage suitable for consumption using an extractable product, the method comprising:
providing an exchangeable capsule, comprising a frusto-conical circumferential first wall, a second wall closing the circumferential first wall at a first end, wherein the second wall is integral with the circumferential first wall, and a flexible sheet-shaped perforate and/or porous third wall closing the circumferential first wall at a second, open, end opposite the second wall, wherein the first, second and third wall enclose an inner space comprising the extractable product, wherein the capsule comprises an outwardly extending rim, wherein the third wall is attached to the outwardly extending rim, wherein the third wall forms an outermost boundary of the capsule in an axial direction thereof, and wherein the third wall comprises filtering paper or a nonwoven filtering material;
providing an apparatus comprising a receptacle for holding the exchangeable capsule, a fluid dispensing device for supplying an amount of a fluid under a pressure of at least six bar to the exchangeable capsule, and an outlet which, in use, is in fluid communication with the capsule for draining the prepared beverage from the capsule and supplying the beverage to a container such as a cup, wherein the receptacle comprises a support surface, wherein the support surface comprises an abutting area intended for said abutment with the third wall, which abutting area comprises ridges having a substantially non-straight form, wherein channel shaped grooves are formed between the ridges in a side of the support surface facing the third wall, for draining the prepared beverage from the capsule through the grooves, wherein the ridges have a convex top, wherein the ridges comprise edges, wherein the edges are not sharp, wherein the edges have a radius of curvature of at least 50 μm;
arranging the exchangeable capsule with the third wall in abutment with the support surface of the receptacle; and supplying the fluid under the pressure to the extractable product for preparing the beverage.

32. The method according to claim 31, wherein:
the receptacle comprises second wall piercing means intended for piercing the second wall of an alternative capsule for creating at least one entrance opening for supplying the fluid to the extractable product through said at least one entrance opening; and
the second wall of the capsule comprises an entrance filter, for supplying the fluid to the extractable product therethrough, which entrance filter, in use, is positioned at a distance from the second wall piercing means, such that the capsule of the system is not pierced by the second wall piercing means and the second wall stays intact.

33. The system according to claim 8, wherein the second wall is formed by a sheet of filtering paper.

34. The system according to claim 8, wherein the second wall is formed by a polymeric film provided with a plurality of entrance openings.

35. The system according to claim 10, wherein the entrance openings and/or side-entrance openings are slits.

36. The system according to claim 10, wherein the entrance openings and/or side-entrance openings are arranged to open under fluid pressure.

37. The system according to claim 25, wherein the tablets have mutually different packing densities.

\* \* \* \* \*